(12) United States Patent
Castillo

(10) Patent No.: US 8,764,094 B1
(45) Date of Patent: Jul. 1, 2014

(54) MULTI-SECTION CARGO COVER

(71) Applicant: GM Global Technology Operations LLC, Detroit, MI (US)

(72) Inventor: Brian V. Castillo, Birmingham, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/736,190

(22) Filed: Jan. 8, 2013

(51) Int. Cl.
*B60P 7/02* (2006.01)

(52) U.S. Cl.
USPC .................................. 296/100.08; 296/100.09

(58) Field of Classification Search
USPC .......................................... 296/100.06–100.1
See application file for complete search history.

(56) References Cited

U.S. PATENT DOCUMENTS

| | | | | |
|---|---|---|---|---|
| 3,858,744 | A | * | 1/1975 | Garvert ........................ 217/60 G |
| 6,435,594 | B1 | * | 8/2002 | Ekonen et al. ........... 296/100.09 |
| 2007/0052257 | A1 | * | 3/2007 | Allen ........................ 296/100.09 |

* cited by examiner

Primary Examiner — Dennis H Pedder
(74) Attorney, Agent, or Firm — Quinn Law Group, PLLC

(57) ABSTRACT

A compartment with a plurality of side-walls and a floor, which together at least partially define a cargo area. The plurality of side-walls include a first side-wall and a second side-wall, wherein the first side-wall is arranged substantially parallel to the second side-wall. The compartment also includes a multi-section panel configured to cover the cargo area. The panel has a first section with a first piece hinged to the first side-wall and a second piece hinged to the first piece, and a second section with a third piece hinged to the second side-wall and a fourth piece hinged to the third piece. When the first, second, third, and fourth pieces are extended relative to the first and second side walls and arranged substantially parallel to the floor, the cargo area is substantially covered by the panel. A vehicle employing such a compartment is also provided.

18 Claims, 4 Drawing Sheets

MULTI-SECTION CARGO COVER

TECHNICAL FIELD

The present disclosure is drawn to a multi-section cargo cover for a vehicle.

BACKGROUND

Vehicles frequently employ storage or cargo areas for carrying personal belongings of the vehicle's passengers and the vehicle's cargo. It may be desirable to cover such storage areas for security, as well as protection of the contents from inclement weather.

A panel may be employed to cover a defined area, such as the vehicle storage area, and form an enclosed compartment. Such a closure panel may also be attached to the compartment for improved convenience.

SUMMARY

A compartment with a plurality of side-walls and a floor, which together at least partially define a cargo area. The plurality of side-walls includes a first side-wall and a second side-wall, wherein the first side-wall is arranged substantially parallel to the second side-wall. The compartment also includes a multi-section panel configured to cover the cargo area. The panel has a first section with a first piece hinged to the first side-wall and a second piece hinged to the first piece, and a second section with a third piece hinged to the first side-wall and a fourth piece hinged to the third piece. When the first, second, third, and fourth pieces are extended relative to the first and second side walls and arranged substantially parallel to the floor, the cargo area is substantially covered by the panel.

The first piece may include a recess configured to accept the second piece when the second piece is folded relative to the first piece and the third piece may include a recess configured to accept the fourth piece when the fourth piece is folded relative to the third piece.

The compartment may also include a fastening mechanism configured to secure the panel in place when the first, second, third, and fourth pieces are extended and the cargo area is substantially covered by the panel.

The compartment may additionally include a first stanchion operatively connecting the first section to the cargo area and a second stanchion operatively connecting the second section to the cargo area. Such first and second stanchions may be configured to facilitate articulation of the respective first and second sections relative to the cargo area.

The compartment may further include first and second locks configured to selectively fix the respective first and second stanchions relative to the cargo area.

Each of the first and second stanchions may be configured as a four-bar linkage.

The plurality of side-walls may include a third side-wall. The compartment may additionally include a track arranged on the third side-wall and each of the first and second stanchions may be configured as a roller that engages the track.

The compartment may be a bed of a pick-up truck. Accordingly, the panel may be configured to selectively open and close access to the bed.

The pick-up truck may include a passenger cab, wherein a longitudinal axis extends through the cab and the bed. In such a case, the first side-wall may be arranged on one side of the axis and the second side-wall may be arranged on the other side of the axis.

Each of the first section and second section may be configured from one of a plastic and a composite material.

A vehicle employing such a compartment is also provided.

The above features and advantages, and other features and advantages of the present disclosure, will be readily apparent from the following detailed description of the many aspects of the present disclosure when taken in connection with the accompanying drawings and appended claims.

DETAILED DESCRIPTION

Figure 1:
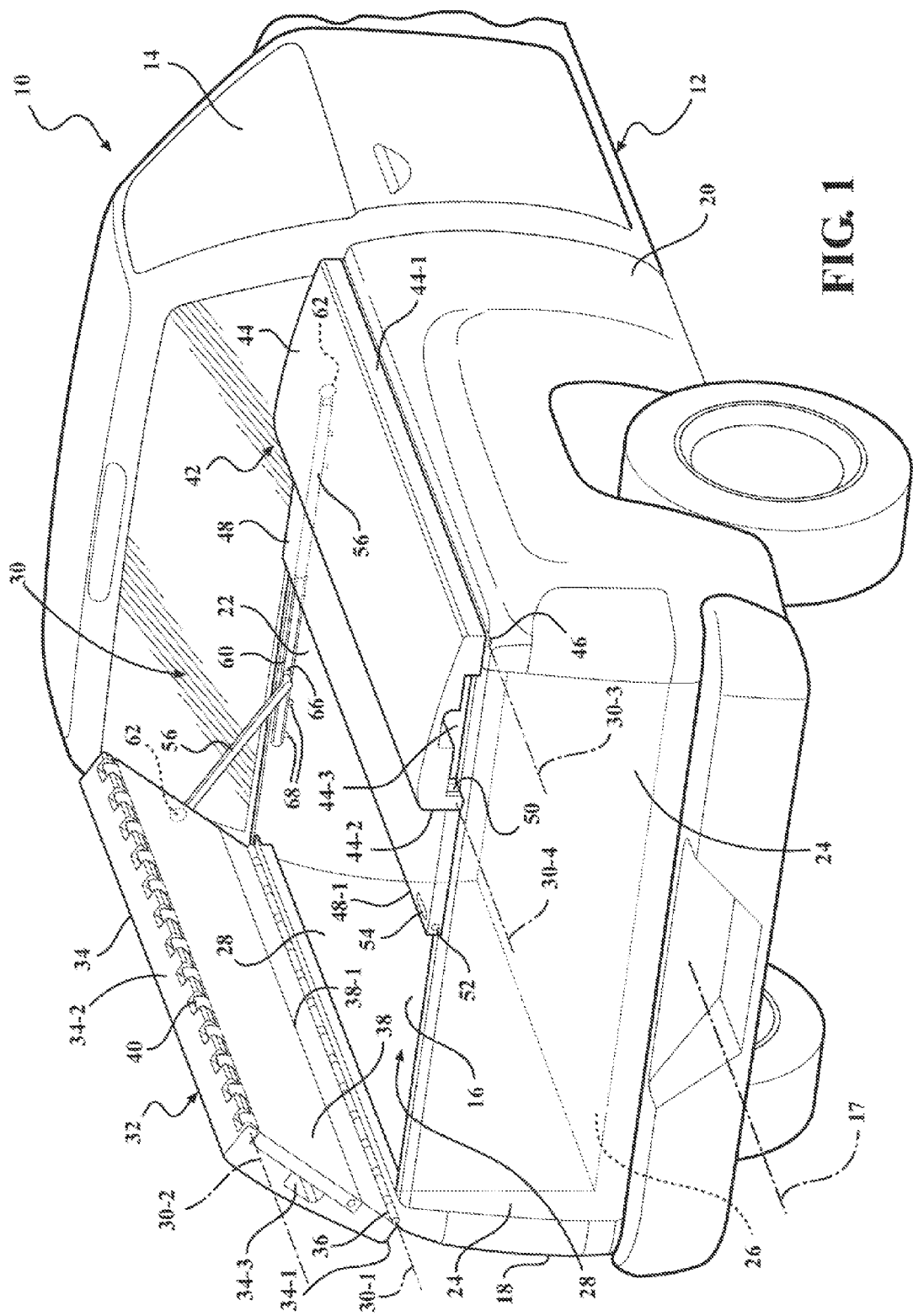
FIG. 1 is a partial rear perspective view of a vehicle having a storage compartment that includes a multi-section panel arranged to cover the compartment; the multi-section panel shown in a partially open state.

Referring to the drawings, wherein like reference numbers refer to like components, FIG. 1 shows a vehicle 10 depicted as a pick-up truck. The vehicle 10 includes a vehicle body 12. The vehicle body 12 defines a passenger compartment 14 and a storage compartment 16. As shown in FIG. 1, the passenger compartment 14 is depicted as a truck cab, while the storage compartment 16 is configured as a truck bed that is generally adapted to carry bulky cargo. A longitudinal axis 17 extends through the passenger compartment 14 and a storage compartment 16.

The storage compartment 16 of FIG. 1 is enclosed on four sides. The storage compartment 16 includes a plurality of generally vertical perimeter walls, shown as a first or left side-wall 18 and a second or right side-wall 20. The first wall 18 is arranged on one side of the axis 17 and is configured as a left side-wall of the bed, while the second wall 20 is arranged on the other side of the axis, and is therefore configured as a right side-wall. The storage compartment 16 also includes a third side-wall or front wall 22, a fourth side-wall or tail-gate 24, and a floor 26. The left side-wall 18 and the right side-wall 20 are arranged substantially parallel to each other, similar to the arrangement of the front wall 22 relative to the tail-gate 24. The side-walls 18, 20, the front wall 24, and the floor 26 together at least partially define a cargo area 28. As shown in FIG. 1, the tailgate 24 may be pivotably connected to the side-walls 18 and 20 for ease of loading and unloading the cargo area 28.

Figure 2:
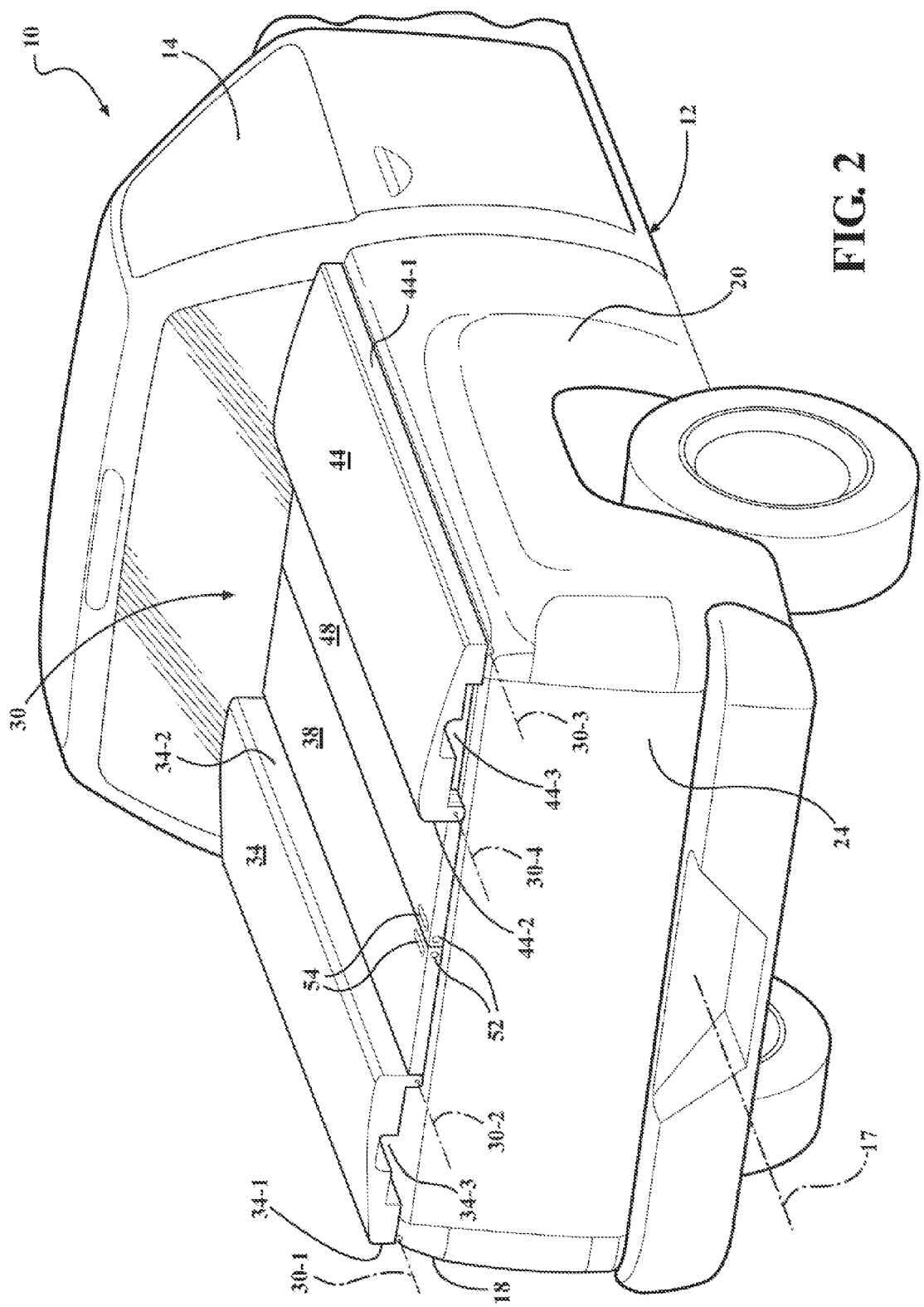
FIG. 2 is a partial rear perspective view of the vehicle shown in FIG. 1, with the storage compartment shown closed by the multi-section panel.

The storage compartment 16 also includes a multi-section panel 30 that is configured to cover the cargo area 28. The multi-section panel 30 includes a first section 32 having a first piece 34 that is hinged or pivotably attached to the left side-wall 18 via a first hinge element 36. The multi-section panel 30 is configured to selectively open and close access to the storage compartment 16, which in FIGS. 1-2 is the bed of the pick-up truck. The multi-section panel 30 also includes a second piece 38 hinged to the first piece 34 via a second hinge element 40. The multi-section panel 30 additionally includes a second section 42 having a third piece 44 hinged to the right side-wall 20 via a third hinge element 46 and a fourth piece 48 hinged to the third piece via a fourth hinge element 50.

Figure 4:
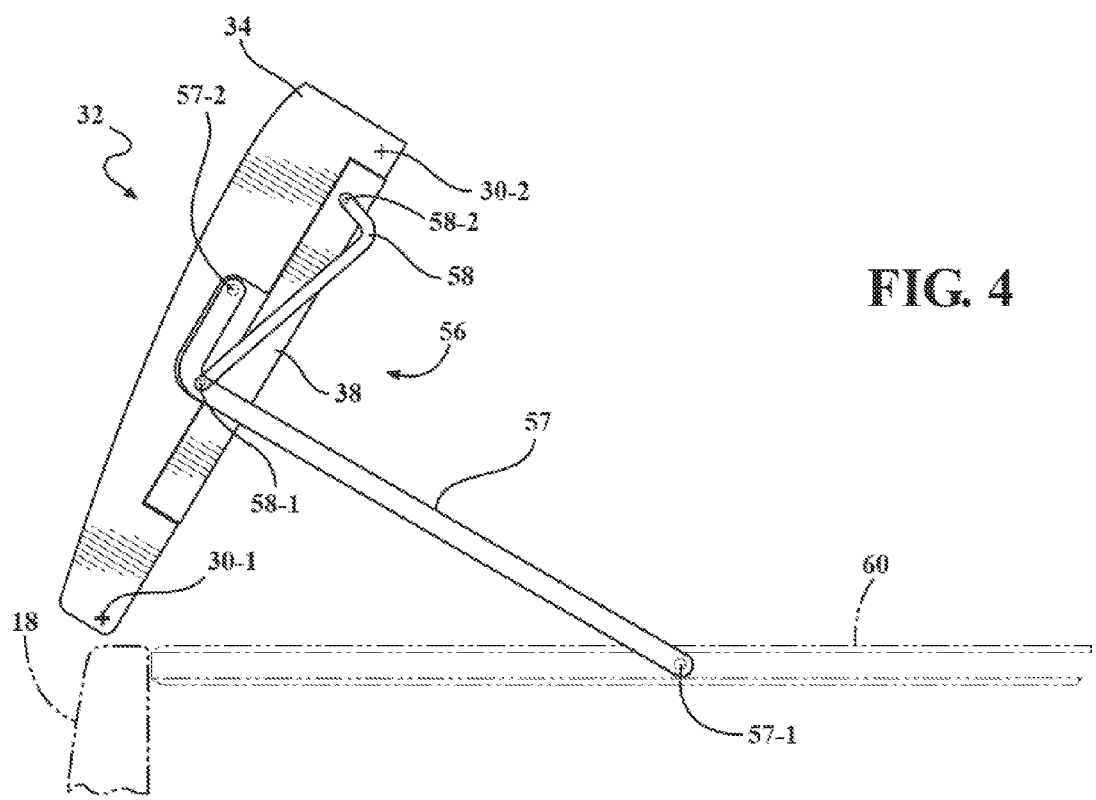
FIG. 4 is a side view of the section of the multi-section panel shown in FIG. 3, the section being depicted in an open state.

The first hinge element 36 is arranged along a first pivot axis 30-1, the second hinge element 40 is arranged along a second pivot axis 30-2, the third hinge element 46 is arranged along a third pivot axis 30-3, and the fourth hinge element 50 is arranged along a fourth pivot axis 30-4. The pivot axes 30-1, 30-2, 30-3, 30-4 are oriented substantially parallel relative to each other and with respect to the longitudinal axis 17. The first piece 34 is defined by an outboard edge 34-1 and an inboard edge 34-2. As shown in FIG. 4, the second pivot axis 30-2 may be arranged inboard of the first pivot axis 30-1 and outboard of the inboard edge 34-2. The third piece 44 is defined by an outboard edge 44-1 and an inboard edge 44-2. The fourth pivot axis 30-4 may be arranged inboard of the third pivot axis 30-3 and outboard of the inboard edge 44-2. Such a construction facilitates the second piece 38 being held in place via the first piece 34 when the first section 32 is extended relative to the left side-wall 18 and the fourth piece 48 being held in place via the third piece 44 when the second section 42 is extended relative to the right side-wall 20. When the first and sections 32, 42 are thus extended, they become arranged substantially parallel to the floor 26 and permit the cargo area 28 to be reliably maintained in a covered state. Pivot 30-2 may be substantially equidistant from pivot 30-1 and from inboard edge 38-1 of the second piece 38. Similarly, pivot 30-4 may be substantially equidistant from pivot 30-3 and from inboard edge 48-1 of the fourth piece 48.

Each of the first and second sections 32, 42 may be constructed from a suitably robust and weather resistant material, such as a molded plastic, a composite, or fiberglass. The sections 32 and 42 may have molded-in color for aesthetics and color permanence. For their part, the first, second, third, and fourth hinge elements 36, 40, 46, 50 may, for example, be constructed from interconnecting extensions of the first piece 34 and the second piece 38, and similarly from the third and fourth pieces 44, 48. Alternatively, the first, second, third, and fourth hinge elements 36, 40, 46, 50 may be constructed from separate metal substructures, such as stainless steel, for corrosion resistance, and attached to the individual first, second, third, and fourth pieces 34, 38, 44, and 48.

In operation, when the first, second, third, and fourth pieces 34, 38, 44, and 48, respectively, are extended and arranged substantially parallel to the floor 26, the cargo area 28 becomes substantially covered by the multi-section panel 30. On the other hand, when the first and third pieces 34, 44 are pivoted into their respective upright positions, the cargo area 28 becomes uncovered and may be accessed for loading and/or unloading of its cargo items. In order to facilitate ease of handling the multi-section panel 30, the first piece 34 may include a recess 34-3 configured to nest the second piece 38 when the second piece is folded relative to the first piece, as shown in FIG. 1. As also shown in FIG. 1, the third piece 44 may similarly include a recess 44-3 configured to nest the fourth piece 48 when the fourth piece is folded relative to the third piece.

The multi-section panel 30 may additionally include a fastening mechanism 52 configured to secure the panel in place when the first, second, third, and fourth pieces 34, 38, 44, and 48, respectively, are extended substantially parallel to the floor 26. The fastening mechanism 52 may include a latch or other device for securing the multi-section panel 30 to the storage compartment 16 at one or more of the side walls 18, 20, 22, and 24. The fastening mechanism 52 may be configured to secure the second piece 38 to the fourth piece 48 when the cargo area 28 is substantially covered by the multi-section panel 30. In such a case, the fastening mechanism 52 can be arranged to connect the edges of the second and fourth pieces 38, 48. For additional security, the fastening mechanism 52 may include a device 54 such as a key- or a combination-lock.

Figure 3:
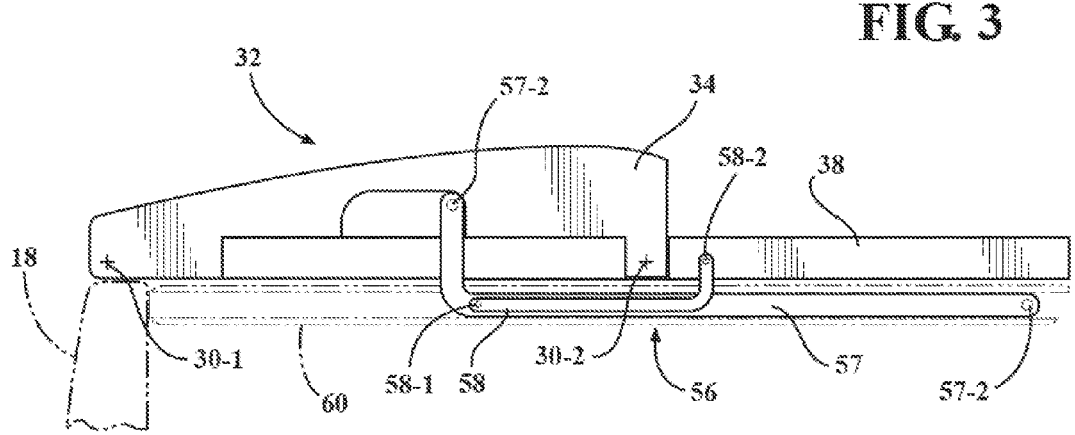
FIG. 3 is a side view of one section of the multi-section panel shown in FIGS. 1-2, the section being depicted in a closed state and supported by a four-bar linkage according to one embodiment.

As shown in FIG. 1, in the multi-section panel 30 may include a stanchion 56 for operatively connecting the first section 32 to the cargo area 28 and another substantially identical stanchion 56 operatively connecting the second section 42 to the cargo area. The stanchion elements 56 are configured to facilitate articulation of the respective first and second sections 32, 42 relative to the cargo area 28 during opening and closing of the cargo area via the multi-section panel 30. Furthermore, stanchions 56 are configured to facilitate articulation of the respective first and second sections 32, 42 relative to the cargo area 28. As shown in FIG. 3, each of the schematically shown stanchions 56 may be configured as a four-bar linkage. A four-bar linkage is typically a closed chain linkage which includes four members connected in a loop by four hinged joints which permits the entire assembly to move in parallel planes.

As shown, the stanchion 56 in the subject four-bar linkage includes a first support element or link 57 having a first end 57-1 that is operatively connected to the front wall 22 and a second end 57-2 that is operatively connected to the first piece 34. As also shown, the stanchion 56 includes a second support element or link 58 that has a first end 58-1 that is operatively connected to the link 57 and a second end 58-2 that is operatively connected to the second piece 38. All operative connections are configured to permit rotation of the support elements relative to components connected thereto. A track 60 is arranged on the front wall 22 such that the first end 57-1 of the link 57 is slidably guided along a path defined by the track during articulation of the respective first and second sections 32, 42 relative to the cargo area 28.

As shown in FIG. 4 in a representative fashion, when the first section 32 is operated to uncover the cargo area 28, as the first end 57-1 of the link 57 slides away from the right side-wall 20, the link 57 rotates relative to the first piece 34. Rotation of the link 57 pulls the link 58, which in turn actuates rotation of the second piece 38. Following the commenced rotation of the second piece 38, the first end 57-1 slides along the track 60 further away from the side-wall 20 and toward the side-wall 18, as the link 57 continues to rotate relative to the first piece 34. Further rotation of the link 57 pulls the link 58, thus continuing the rotation of the second piece 38. In a substantially upright position, the link 57 supports both the first piece 34 and the second piece 38, while the second piece becomes nested or stowed inside the recess 34-3. The support elements 57, 58 may be similarly incorporated into the second section 42.

Figure 5:
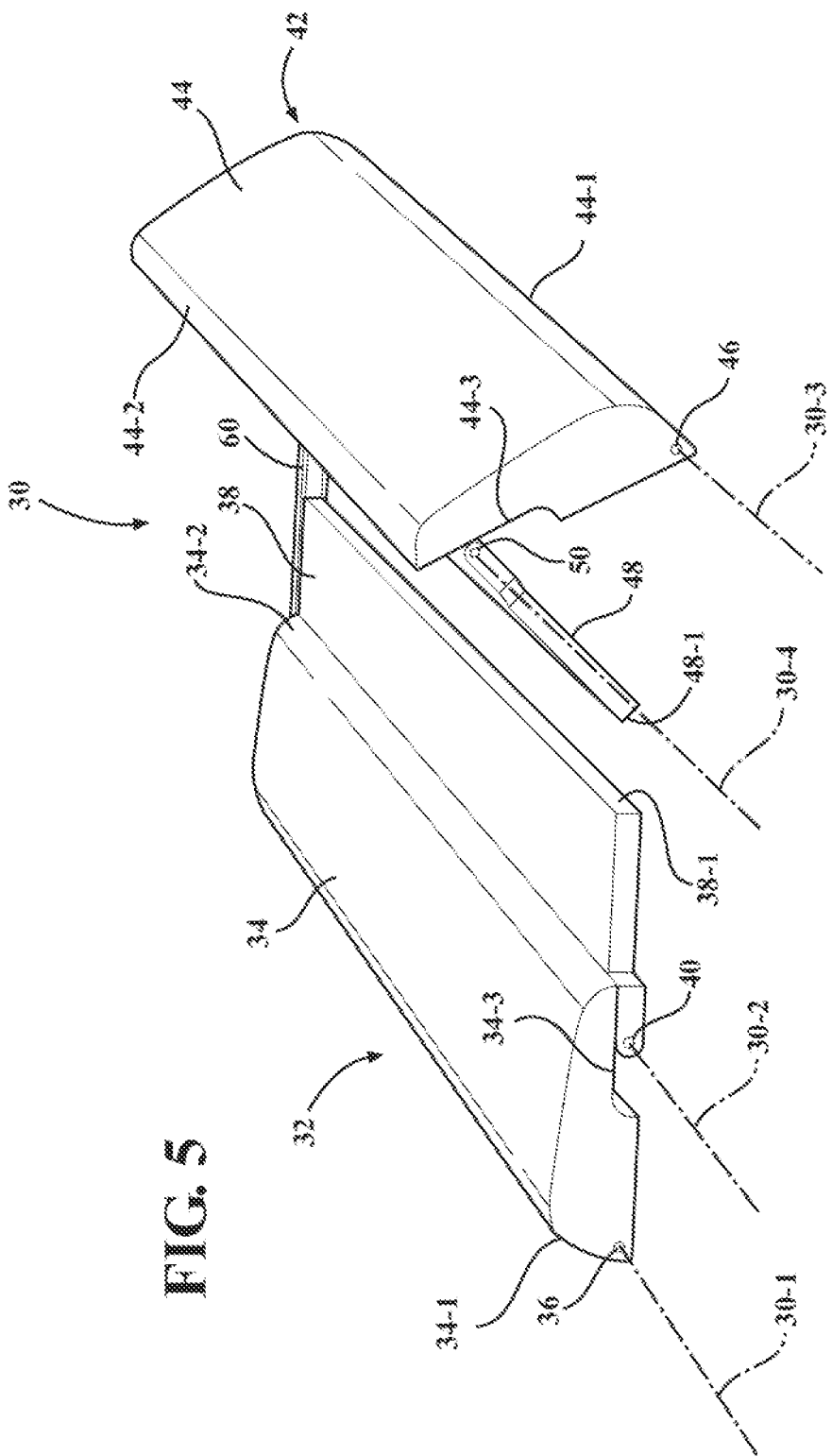
FIG. 5 is a perspective view of the multi-section panel shown in FIGS. 1-2 according to another embodiment.

As shown in FIG. 5, the second piece 38 may also be configured to prop up the first piece 34, while the fourth piece 48 may be used to prop up the third piece 44, when the third and fourth sections are partially unfolded. Accordingly, the sections 32 and 42 may be configured to free-stand at least temporarily relative to the side-walls 18-24 without employing any additional support structures.

As shown in FIG. 1, the storage compartment 16 includes individual locks 62 that are configured to selectively fix each respective stanchion 56 relative to the cargo area 28. Additionally, each of the stanchions 56 may include the roller 66 to engage the track 60 therewith. The track 60 may include one or more detents 68 that are configured to retain the subject rollers in specified positions relative to the cargo area 28. Hence, stanchions 56 may maintain the respective first and second sections 32, 42 in position in which the cargo area 28 remains uncovered. Accordingly, stanchions 56 may be used to facilitate ease of loading bulky items in the cargo area 28. Each of the stanchions 56 may also be configured to lock in place when the respective first and second sections 32, 42 of the multi-section panel 30 are in the position in which cargo area 28 is covered.

The detailed description and the drawings or figures are supportive and descriptive of the many aspects of the present disclosure. While certain aspects have been described in detail, various alternative aspects exist for practicing the invention as defined in the appended claims.

The invention claimed is:

1. A compartment comprising:
  a plurality of side-walls and a floor, which together at least partially define a cargo area, the plurality of side-walls including a first side-wall, a second side-wall, and a third side-wall, wherein the first side-wall is arranged substantially parallel to the second side-wall and the third side-wall is arranged substantially perpendicular to each of the first and second side-walls;
  a track arranged on the third side-wall; and
  a multi-section panel configured to cover the cargo area, the panel having:
    a first section having a first piece hinged to the first side-wall and a second piece hinged to the first piece;
    a second section having a third piece hinged to the second side-wall and a fourth piece hinged to the third piece; and
    a first stanchion operatively connecting the first section to the cargo area and a second stanchion operatively connecting the second section to the cargo area;
  wherein;
    when the first, second, third, and fourth pieces are extended relative to the first and second side-walls and arranged substantially parallel to the floor, the cargo area is substantially covered by the panel;
    the first and second stanchions are configured to facilitate articulation of the respective first and second sections relative to the cargo area; and
    each of the first and second stanchions engages and is guided by the track for movement along the track.

2. The compartment of claim 1, wherein the first piece includes a recess configured to accept the second piece when the second piece is folded relative to the first piece and the third piece includes a recess configured to accept the fourth piece when the fourth piece is folded relative to the third piece.

3. The compartment of claim 1, further comprising a fastening mechanism configured to secure the panel in place when the first, second, third, and fourth pieces are extended and the cargo area is substantially covered by the panel.

4. The compartment of claim 1, further comprising first and second locks configured to selectively fix the respective first and second stanchions relative to the cargo area.

5. The compartment of claim 1, wherein each of the first and second stanchions is configured as a four-bar linkage.

6. The compartment of claim 1, wherein each of the first and second stanchions includes a roller that engages the track.

7. The compartment of claim 1, wherein the compartment is a bed of a pick-up truck and the panel is configured to selectively open and close access to the bed.

8. The compartment of claim 7, wherein the pick-up truck includes a passenger cab, a longitudinal axis extends through the cab and the bed, the first side-wall is arranged on one side of the axis, and the second side-wall is arranged on the other side of the axis.

9. The compartment of claim 1, wherein each of the first section and second section is configured from one of a plastic and a composite material.

10. A vehicle comprising:
  a passenger compartment; and
  a storage compartment having:
    a plurality of side-walls and a floor, which together at least partially define a cargo area, the plurality of side-walls including a first side-wall, a second side-wall, and a third side-wall, wherein the first side-wall is arranged substantially parallel to the second side-wall and the third side-wall is arranged substantially perpendicular to each of the first and second side-walls;
    a track arranged on the third side-wall; and
    a multi-section panel configured to cover the cargo area, the panel having:
      a first section having a first piece hinged to the first side-wall and a second piece hinged to the first piece;
      a second section having a third piece hinged to the second side-wall and a fourth piece hinged to the third piece; and
      a first stanchion operatively connecting the first section to the cargo area and a second stanchion operatively connecting the second section to the cargo area;
  wherein;
    when the first, second, third, and fourth pieces are extended relative to the first and second side-walls and arranged substantially parallel to the floor, the cargo area is substantially covered by the panel;
    the first and second stanchions are configured to facilitate articulation of the respective first and second sections relative to the cargo area; and
    each of the first and second stanchions engages and is guided by the track for movement along the track.

11. The vehicle of claim 10, wherein the first piece includes a recess configured to accept the second piece when the second piece is folded relative to the first piece and the third piece includes a recess configured to accept the fourth piece when the fourth piece is folded relative to the third piece.

12. The vehicle of claim 10, further comprising a fastening mechanism configured to secure the panel in place when the first, second, third, and fourth pieces are extended and the cargo area is substantially covered by the panel.

13. The vehicle of claim 10, further comprising first and second locks configured to selectively fix the respective first and second stanchions relative to the cargo area.

14. The vehicle of claim 10, wherein each of the first and second stanchions is configured as a four-bar linkage.

15. The vehicle of claim 10, wherein each of the first and second stanchions includes a roller that engages the track.

16. The vehicle of claim 10, wherein the storage compartment is a bed of a pick-up truck and the panel is configured to selectively open and close access to the bed.

17. The vehicle of claim 16, wherein the pick-up truck includes a passenger cab, a longitudinal axis extends through the cab and the bed, the first side-wall is arranged on one side of the axis, and the second side-wall is arranged on the other side of the axis.

18. The vehicle of claim 10, wherein each of the first section and second section is constructed from one of a plastic and a composite material.

* * * * *